219-121 SR

MTR04 XR 3,210,171

Oct. 5, 1965 W. J. MacDONALD 3,210,171

METHOD OF SUPPLYING HEAT OF FUSION TO GLASS-TO-GLASS SEAL

Filed Sept. 12, 1960

INVENTOR
WILLIAM J. MAC DONALD
BY Spencer E. Olson
ATTORNEY

United States Patent Office 3,210,171
Patented Oct. 5, 1965

3,210,171

METHOD OF SUPPLYING HEAT OF FUSION TO GLASS-TO-GLASS SEAL

William J. MacDonald, Littleton, Mass., assignor to Sylvania Electric Products Inc., a corporation of Delaware Filed Sept. 12, 1960, Ser. No. 55,389
8 Claims. (Cl. 65—43)

This invention relates to a method and apparatus for localizing the application of heat to a specific area. More particularly, the invention is concerned with a method for supplying heat to a defined localized area of small dimensions of sufficient intensity to affect fusion between two glass members.

This invention has particular applicability in the fabrication of microelectronic circuitry of a form consisting of stacked wafer elements having circuit components printed, evaporated, or otherwise affixed thereto. As described in application Ser. No. 55,238, filed September 10, 1960 by John R. Moore, Robert E. Stapleton, and Gerald J. Selvin entitled "Microelectronic Circuit Modules," now abandoned, it may be desirable to individually hermetically seal groups of circuit components on the individual wafers, which may be accomplished by sealing a cup-shaped cover or "hat" to the wafer element to cover the circuit elements. According to one embodiment of this technique, the "hat" is formed of glass and is joined to the wafer, normally formed of alumina, by a glass-to-glass-to-ceramic seal. In the fabrication of the seal, a bead of glass, corresponding to the perimeter of the "hat" is applied to the ceramic wafer and fused thereto. Thereafter, the glass "hat" is placed upon the bead of glass and fused thereto by localized application of heat around the perimeter of the "hat." Localized heating is essential because of the temperature-sensitiveness of certain of the electrical components on the wafer, and because of the very small size of the wafers (approximately one-half inch square) the problem of applying the necessary heat to fuse the seal has heretofore been extremely difficult. Moreover, in some applications it is desirable to seal the hat to the wafer in an inert atmosphere so as to contain the electrical components in such inert atmosphere. Techniques heretofore available have been unsatisfactory for this application.

It is a primary object of the present invention to provide an improved method for making glass-to-glass seals.

Another object of the invention is to provide a method for locally applying heat to a specific area.

Still another object of the invention is to provide a method for applying heat along the perimeter of a very small assembly while preventing the application of heat to the area within the perimeter.

A more specific object of the invention is to provide a method for supplying heat only around the periphery of a cup-shaped glass cover of sufficient intensity to fuse the cover to a glass bead which may be in the form of a narrow flat strip or band previously applied to a ceramic wafer having temperature-sensitive circuit elements thereon.

These objects are attained, according to the invention, through the use of a higher resolution thermal image device similar to an arc image furnace. In general, the thermal imaging device employed consists of two reflecting mirrors mounted relative to each other to create a real image of an object. The object is placed at the focal point of one mirror and the image of the object is formed at the focal point of the second mirror. The mirrors may be paraboloids, ellipsoids, or any configuration capable of creating the real images. In accordance with the present invention, the source of heat is shaped to conform with the perimeter of the glass "hat," whereby the image of the source has the same shape. The assembly to be sealed is positioned at the image of the optical system, with the shaped image aligned with the perimeter of the assembly to be sealed. The shaped heat source, which may be a tungsten filament, is energized for a sufficient period for the thermal energy at the image to fuse the glass "hat" to the ceramic wafer, and then may be turned off. Alternatively, the source may be continuously energized and the assembly to be sealed inserted into the image region for a sufficient period to effect the fusion. The image region may be and preferably is external of the optical system, and somewhat remote from the source, whereby the glass members to be sealed may be contained in a controlled atmosphere during the sealing operation.

Other features and advantages of the invention, and a better understanding of the organization of the thermal image device and its application to the fabrication of microelectronic wafer elements will be had from the following detailed description taken in conjunction with the accompanying drawings, in which.

Figure 1:
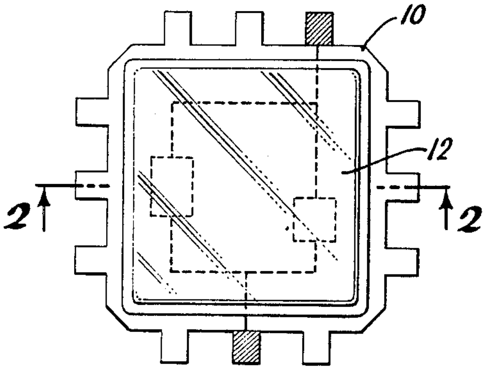
FIG. 1 is a plan view of a microelectronic wafer element in the fabrication of which the present method finds particular applicability.
Figure 2:
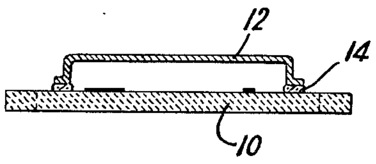
FIG. 2 is an elevation cross-section view of the assembly of FIG. 1, taken along the line 2—2.

Referring now to the drawings, FIGS. 1 and 2 are plan and elevation views, respectively, of a typical microelectronic wafer filament, consisting generally of a ceramic wafer substrate 10 and a cup-shaped glass "hat" 12 sealed thereto. The assembly is shown greatly enlarged in the drawings, typical dimensions for the wafer being 0.5 x 0.5 inch with a thickness of 8 to 12 mils. The wafer element carries or supports one or more electrical circuit elements or components which may be printed, etched, plated, or otherwise attached or deposited by available techniques. The application of these circuit elements to the wafer forms no part of the present invention; it is significant, however, that these elements are usually of a form which would be damaged is subject to heat at temperatures necessary for fusing glass-to-glass. The circuit elements on the wafer are connected by printed wiring to selected tabs projecting from the coating to facilitate electrical connection to other wafer elements. Because of the sensitivity of the electrical components to contaminants, they are preferably hermetically sealed from the surrounding environment, the glass hat 12 being provided for this purpose.

Preparatory to making the seal, a glass bead or band 14 is applied around the perimeter of the wafer 10, as by fusing the band to the wafer, the bead being of sufficient thickness to completely cover printed conductors joining the circuit elements to the conductive tabs. The glass bead 14 may have a lower softening and working temperature than the "hat" 12, and a coefficient of thermal expansion to match the material of the wafer 10, usually ceramic, and the glass of the "hat." The glass cover is then placed over the components with the lip of the cover in register with the bead of glass 14. The lip of the cover is fused to the bead by application of heat in the region of the lip only, so as not to damage the circuit elements on the wafer.

Figure 3:
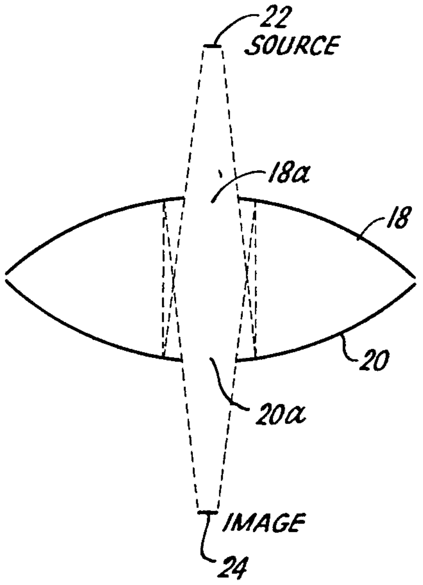
FIG. 3 is a schematic diagram of one form of thermal imaging device useful in the practice of the method according to the invention.

In accordance with the present invention, the necessary heat for fusing the "hat" to the glass bead 14 is provided by a thermal image device, one form of which is schematically illustrated in FIG. 3 Two identical parabolic reflectors 18 and 20 are mounted face to face with the focal point of each at or beyond the vertex of the other. The two reflectors are provided with central openings 18*a* and 20*a*, respectively, to allow radiant energy to enter and leave the compound reflective optical system. A source of thermal energy is shown at 22, lying on the central axis of the reflectors, the image 24 of the source appearing at the opposite side of the optical system, the source to image ratio being equal to one. As shown in the sketch, each ray of energy from the source 22, travelling radially to the reflective surface of paraboloid 20 is reflected directly across, parallel to all other rays, to the reflective surface of paraboloid 18 where it is reflected in a converging angle to the image 24. Consequently, if a shaped source of heat energy is placed at 22, the image of the source, with the same shape, appears at 24.

To achieve local application of heat to the lip of the cover, the source 22 is of a size and shape to conform with the periphery of the glass "hat" 12, and may be in the form of shaped filament 22*a* in an incandescent bulb. The filament may be made of a thickness to correspond to the width of the lip on the "hat" 12 whereby at the image there appears a "band" or outline of heat which may be registered with the lip on the "hat." Thus, in the present application, a square tungsten filament, which may be designed to have a temperature of the order of 2800° C. may be used as the heat source, and because of the one-to-one source to image ratio, a square image of the same dimensions appears at 24. Alternatively, the source may have an area approximately equal to the area of the wafer element with the central portion blanked out by a square mask of suitable refractory material to produce a square rim of heat at the image position.

The period of application of heat to the assembly to be sealed may be controlled electrically simply by turning the source on and off, by a shutter mechanism disposed between the source and the optical assembly, or by moving the wafer assembly into and out of the image position. A significant feature of this method of applying heat is that the high intensity heat image of controllable shape and size may be projected into an environment external to the optical system. That is, the assembly to be sealed may be placed within a chamber 26, which may contain an inert gas, for example, so as to encapsulate the circuit elements on the wafer in this gas. Thus, this heating method is very clean, it does not cause deleterious oxidation, and most importantly, the heat can be applied only where it is wanted. It has been observed that a temperature of 1500° C. can be obtained in a shaped thermal image from a source having a temperature of 2800° C.

Figure 4:
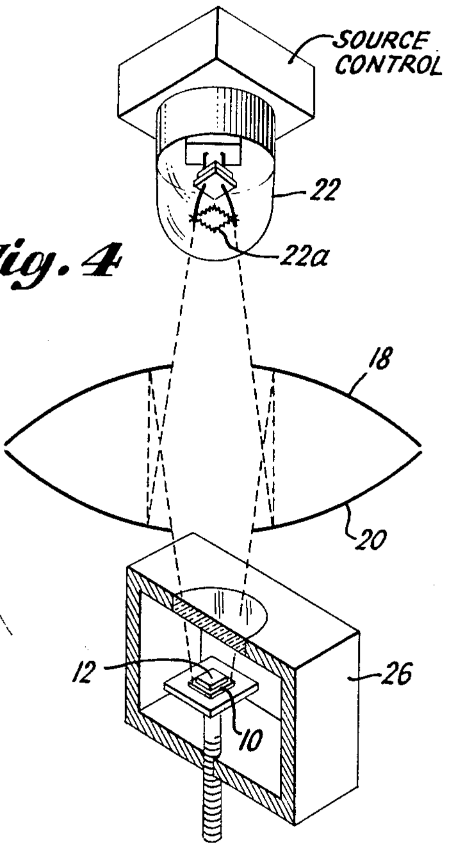
FIG. 4 is a schematic diagram of the device of FIG. 3 modified for the localized application of heat around the perimeter of the assembly of FIGS. 1 and 2.

Although the apparatus of FIG. 4 has been described in connection with its specific applicability to the sealing of assemblies of the forms shown in FIGS. 1 and 2, it will now be appreciated that the technique is also particularly useful for any process requiring a localized or shaped source of heat applicable in any atmosphere without concern for the protection of the heat source.

What is claimed is:

1. The method of fabricating a hermetically sealed package of electronic components affixed to a predetermined area on a ceramic base, which method comprises applying a bead of glass on said base encompassing said area, positioning a cup-shaped glass cover on the base with its perimeter in register with said bead of glass, providing a source of thermal energy of the same size and shape as the periphery of said area, providing a support remote from said source on which said package to be sealed is placed, transmitting energy from said source onto said package to form on said package an energy image of said source the shape and outline dimensions of which correspond substantially to the shape and dimensions of said bead of glass, and placing said package on said support with the perimeter of said cover in register with said energy image for a period sufficient to fuse the glass of said cover to said bead of glass.

2. The method of fabricating a hermetically sealed package of electronic components affixed to a small ceramic wafer, which method comprises applying a bead of glass around the perimeter of said wafer, positioning a cup-shaped glass cover having a lip on its perimeter on said wafer with said lip in register with said bead of glass, providing a source of thermal energy having outline shape and dimensions corresponding to the shape and dimensions of said lip, providing a support remote from said source on which said package to be sealed is placed, transmitting energy from said source onto said package to fórm on said package an energy image of said source, corresponding substantially to the shape and dimensions of said lip, and adjusting the position of said package on said support, with the lip on said cover in register with said energy image, for a period sufficient to fuse the glass of said lip to said bead of glass.

3. The method of fabricating a hermetically sealed package of electronic components affixed to a small ceramic wafer, which method comprises fusing a bead of glass around the perimeter of said wafer, positioning a cup-shaped glass cover having a lip on its perimeter on said wafer with said lip in register with said bead of glass, providing a source of thermal energy having outline shape and dimensions corresponding to the shape and dimensions of said lip, providing a support remote from said source on which said package to be sealed is placed, transmitting energy from said source onto said package to form on said package an energy image of said source, corresponding substantially to the shape and dimensions said lip, surrounding at least the region of said support with a gas with which it is desired to fill said package, and adjusting the position of said package on said support, with the lip on said cover in register with said energy image, for a period sufficient to fuse the glass of said lip to said bead of glass.

4. The method of fabricating a hermetically sealed package of electronic components affixed to a small rectangular ceramic wafer, which method comprises fusing a bead of glass to one surface of said wafer around the perimeter thereof, positioning a cup-shaped glass cover of rectangular shape and having a lip around its perimeter on said wafer with said lip in register with said bead of glass, providing a high temperature source of thermal energy having shape and outline dimensions corresponding the shape and dimensions of said lip, providing a support remote from said source on which said package to be sealed is placed, transmitting energy from said source onto said package to form on said package an energy image of said source corresponding in size and shape to the size and shape of the lip, enclosing at least the volume surrounding the support and package in a desired atmosphere, and positioning said package on said support, with the lip on said cover in register with the energy image, for a period sufficient to fuse the glass of said lip to said bead of glass.

5. A method for applying heat around the periphery of a predetermined area only on a workpiece comprising the steps of providing a filamentary source of thermal energy of the same size and shape as the periphery of said area, providing a support remote from the source of energy for a workpiece on which the workpiece is placed, transmitting the thermal energy from the source onto the workpiece on the support to form a thermal image thereon, the size and shape of which correspond substantially to the size and shape of the periphery of said area, and adjusting the position of the workpiece on said support to cause the periphery of the area thereof to register with the thermal image.

6. In the fabrication of an hermetically sealed microelectronic package including a flat substrate having electrical components affixed to a predetermined area of one surface thereof and a bead of glass on said one surface surrounding said area, and a cup-shaped glass cover the perimeter of which conforms in shape to said area, a method for locally applying heat only around the perimeter of said glass cover to fuse the cover with said bead of glass which comprises providing a source of thermal energy having shape and outline dimensions corresponding substantially to the shape and dimensions of said bead of glass, providing at a location remote from said source a support for said package to be sealed on which the package is placed, transmitting the thermal energy of said source onto the package on the support to form a thermal image thereon, the shape and outline dimensions of which correspond substantially to the shape and outline dimensions of said bead of glass, and adjusting the position of said package with the perimeter of said energy cover in register with said image for a period sufficient to fuse the glass of said cover to said bead of glass.

7. A method for applying heat in a band of predetermined width around a periphery of a predetermined area only on a workpiece comprising: providing a high temperature filamentary source of thermal energy of the same size and shape as the periphery of said area, the width of the filament corresponding to the width of said band, providing a support at a location remote from said source of energy on which the workpiece is placed, transmitting thermal energy from said source onto said workpiece to form a thermal image thereon of the peripheral size and shape of the workpiece and adjusting the position of the workpiece with respect to the thermal image thereon to effect register of the periphery of the workpiece with the thermal image.

8. A method of applying heat around the periphery of a predetermined area only of a workpiece comprising the steps of providing a filamentary source of thermal energy of a shape symmetrical with the periphery of said area, providing at a location remote from said source a support on which the workpiece is placed, transmitting thermal energy from said source onto the workpiece on said support in a manner so that the projected energy from said filamentary source onto said workpiece shall conform in size as well as shape to the periphery of said area and orienting the workpiece to such a position with respect to the source that the energy image of said filamentary source registers with the periphery of the workpiece.

References Cited by the Examiner

UNITED STATES PATENTS

| | | | |
|---|---|---|---|
| 2,629,093 | 2/53 | Pask et al. | 65—43 X |
| 2,820,131 | 1/58 | Kodama | 250—105 X |
| 2,932,720 | 4/60 | Stohr. | |
| 3,028,491 | 4/62 | Schleich. | |

FOREIGN PATENTS

| | | |
|---|---|---|
| 747,917 | 10/44 | Germany. |

DONALL H. SYLVESTER, *Primary Examiner.*

ARTHUR P. KENT, *Examiner.*